Patented Aug. 7, 1951

2,563,621

UNITED STATES PATENT OFFICE 2,563,621

SYNTHETIC SMOKE

Alexander J. Ritchie, Bayonne, N. J., assignor to Electric Boat Company, Bayonne, N. J., a corporation of New Jersey No Drawing. Application January 26, 1946, Serial No. 643,829

3 Claims. (Cl. 252—305)

This invention relates to synthetic fog or smoke, and has for its object the provision of an improved composition of matter for developing such fog or smoke. More particularly, the invention contemplates an improved smoke composition for aerial discharge from aircraft.

Titanium tetrachloride, a liquid at normal temperatures, is a very suitable base for synthetic smoke compositions. When sprayed into the atmosphere by compressed or liquified gas, such as carbon dioxide, titanium tetrachloride ($TiCl_4$) is hydrolyzed by the moisture in the atmosphere into titanium hydrate ($Ti(OH)_4$) and hydrochloric acid (HCl). Hydrochloric acid is hygroscopic and forms liquid droplets by absorption of atmospheric moisture, and the minute nascent particles of titanium hydrate provide nuclei for the formation of these liquid droplets. Disseminated in the atmosphere, the minute particles of titanium hydrate and liquid droplets of hydrochloric acid produce an effective white smoke. The particles of titanium hydrate, even though minute, are crystalline solids, and tend to plug up lines, nozzles etc. of the usual smoke generating apparatus operating from surface craft on water or vehicles on land, and various expedients have been proposed, both with respect to the smoke composition and the construction of the smoke generator, to overcome this difficulty. However, when operating from aircraft, such a high rate of discharge of the smoke composition is necessary, due to the usual high speeds of the aircraft, that restricting lines and nozzles can be eliminated.

While the usual high speeds of aircraft permit a high rate of discharge of the smoke composition, I have found that the smoke producing reaction, that is the hydrolyzation, of the composition when discharged into the atmosphere at this high rate proceeds too rapidly for the production of an entirely satisfactory smoke or fog. I have further found that the smoke producing reaction can be advantageously slowed down by interspersing with the discharged particles of the smoke composition other minute solid particles which collide with and impede their hydrolyzation, and thus retard the smoke producing reaction.

The present invention thus contemplates an improved composition of matter for producing smoke or fog consisting principally of titanium tetrachloride containing a smoke-producing retarding agent. The retarding agent should be a solid within the usual temperature range of smoke production and should be soluble in an effective amount in titanium tetrachloride and nonreactive therewith within that temperature range.

Carbon trichloride or hexachloroethane ($C_2Cl_6$) is ideally suited for the purpose, and from 5 to 20% by weight, based on the weight of titanium tetrachloride, may be dissolved in the liquid titanium tetrachloride of smoke compositions of the invention. Approximately 10% by weight of carbon trichloride is a very effective amount to dissolve in the titanium tetrachloride. Hexachloroethane is a solid at ordinary temperatures and is readily soluble in titanium tetrachloride. Its solubility decreases with decreasing temperature, but at freezing temperature from 18-20% by weight of hexachloroethane can be dissolved in titanium tetrachloride. The amount of hexachloroethane or equivalent retarding agent dissolved in the titanium tetrachloride should not be greater than the solubility of the agent at the lowest temperature to which the smoke composition is subjeced, which for most practical purposes is about freezing temperature (i. e. 0° C.). At least 5% of the agent is required to impart an effective or beneficial retarding action on smoke production. In addition to its retarding effect, hexachloroethane is also effective in the production of smoke itself. When the smoke composition of the invention is sprayed or discharged into the atmosphere, the hexachloroethane comes out of solution in the titanium tetrachloride in the form of minute solid particles capable of producing smoke in the same manner as the minute solid particles of titanium hydrate. Thus, the inclusion of hexachloroethane in the smoke composition supplements the smoke effect of the composition when discharged into the atmosphere.

The smoke composition of the invention, in its complete form, includes a pressure-creating agent for discharging the composition from a suitable container thereof. In other words the composition is confined under an appropriate pressure within a suitable container, such as a cylinder or bottle of stainless steel or the like. Carbon dioxide is the customary pressure-creating agent, and may be forced in liquid form into the solution of titanium tetrachloride and hexachloroethane in which it is soluble. From 2 to 5%, and preferably around 3% by weight of liquid carbon dioxide in the complete smoke composition gives satisfactory results. The following is one composition of the invention which has given excellent results in practice:

|  | Pounds |
|---|---|
| Titanium tetrachloride | 700 |
| Hexachloroethane | 75 |
| Carbon dioxide (liquid) | 25 |

In compounding the composition, the hexachloroethane is first dissolved in the titanium tetrachloride, and the resulting solution is introduced into the container. The container is then closed and sealed and the liquid carbon dioxide is introduced through an appropriate valve.

I claim:

1. A composition of matter for aerial discharge from aircraft for producing synthetic smoke comprising titanium tetrachloride containing in solution about 10% by weight, based on the weight of the titanium tetrachloride, of hexachloroethane to impede hydrolyzation of the titanium tetrachloride.

2. A composition of matter for aerial discharge from aircraft for producing synthetic smoke confined in a container under pressure created by carbon dioxide and comprising titanium tetrachloride containing in solution from 5 to 20% by weight, based on the weight of the titanium tetrachloride, of hexachloroethane to impede hydrolyzation of the titanium tetrachloride.

3. A composition of matter for aerial discharge from aircraft for producing synthetic smoke confined in a container under pressure created by carbon dioxide and comprising titanium tetrachloride containing in solution about 10% by weight, based on the weight of the titanium tetrachloride, of hexachloroethane to impede hydrolyzation of the titanium tetrachloride and from 2 to 5% by weight, based on the weight of the entire composition, of carbon dioxide.

ALEXANDER J. RITCHIE.

REFERENCES CITED

The following references are of record in the file of this patent:

UNITED STATES PATENTS

| Number | Name | Date |
| --- | --- | --- |
| 1,338,343 | Weiss et al. | Apr. 27, 1920 |
| 1,632,339 | Kiefer | June 14, 1927 |
| 2,407,384 | Ritchie | Sept. 10, 1946 |